United States Patent
Floyd

(10) Patent No.: US 7,027,455 B2
(45) Date of Patent: Apr. 11, 2006

(54) SERIAL DATA TRANSMITTERS

(75) Inventor: Geoffrey Edward Floyd, Yelverton (GB)

(73) Assignee: Zarlink Semiconductor Limited, (GB)

( * ) Notice: Subject to any disclaimer, the term of this patent is extended or adjusted under 35 U.S.C. 154(b) by 963 days.

(21) Appl. No.: 10/068,593

(22) Filed: Feb. 5, 2002

(65) Prior Publication Data

US 2002/0154650 A1    Oct. 24, 2002

(30) Foreign Application Priority Data

Feb. 22, 2001 (GB) .................................. 0104332

(51) Int. Cl.
*H04L 12/56* (2006.01)
(52) U.S. Cl. ................ 370/412; 370/429; 370/394
(58) Field of Classification Search ........ 370/229–235, 370/360–388, 394, 395.71, 395.72, 412–429
See application file for complete search history.

(56) References Cited

U.S. PATENT DOCUMENTS

| | | | |
|---|---|---|---|
| 4,715,045 A * | 12/1987 | Lewis et al. ................. | 375/285 |
| 4,843,606 A | 6/1989 | Bux et al. | |
| 5,251,212 A | 10/1993 | Gass | |
| 5,668,807 A | 9/1997 | Shachar et al. | |
| 5,777,987 A * | 7/1998 | Adams et al. .............. | 370/336 |
| 5,983,278 A * | 11/1999 | Chong et al. ............... | 709/235 |
| 6,850,490 B1 * | 2/2005 | Woo et al. .................. | 370/230 |

OTHER PUBLICATIONS

Varada, S. et al., "Data flow and Buffer management in multi-channel data link controller," 1999 IEEE, pp. 132-141.
"User's Manual—MPC8260 PowerQUICC II™" by Motorola, Inc. (1999).

* cited by examiner

*Primary Examiner*—Dang Ton
*Assistant Examiner*—Phuc Tran
(74) *Attorney, Agent, or Firm*—Thompson Hine LLP

(57) ABSTRACT

A method of providing data for transmission on a time division multiplexed (TDM) serial data stream. The method comprises mapping channels of the TDM stream to contexts, each context comprising a set of memory buffers for storing data to be transmitted. Data is extracted from the contexts in a sequence defined by said mapping and transmitting the extracted data on the TDM stream. When a buffer or buffers of a context become empty, a buffer refill request is generated to cause data to be read from a memory to refill the buffer, wherein each buffer refill request is assigned a priority. The context buffers are refilled in an order defined by the respective priorities of the refill requests.

9 Claims, 2 Drawing Sheets

SERIAL DATA TRANSMITTERS

This application claims priority to British Patent Application No. 0104332.2, filed Feb. 22, 2001.

FIELD OF THE INVENTION

The present invention relates to serial data transmitters and more particularly to a queuing system for serial data transmitters using time division multiplexing.

BACKGROUND TO THE INVENTION

Time division multiplexing (TDM) is a mechanism commonly used for sharing resources on a communication link. Consider for example a single cable connecting multiple voice or data channels between call switches. The link is divided in time into successive frames of equal duration. Each frame is further sub-divided in time into a sequence of slots (numbered 0 to n), where each slot can accommodate 8 bits. The number of slots in a frame is determined by the data rate of the link and the duration of the frame. Multiple channels are formed on a data stream by allocating respective slot numbers to channels. Thus, a first channel (CH0) is formed from the set of first slots in successive frames, a second channel (CH1) is formed from the set of second slots in successive frames, etc.

Data is provided to a TDM serial data transmitter from a source (referred to hereinafter as an "external" memory because it does not form part of the serial data transmitter per se). Data is temporarily stored at the serial data transmitter in a set of data queues, one for each "context". Each context comprises a plurality of buffers (e.g. three). FIG. 1 illustrates schematically the architecture of a part of a TDM serial data transmitter. A TDM interface 1 provides data requests at regular intervals to a context lookup table 2. The lookup table maintains a mapping between TDM channel numbers and "context" numbers. The lookup table 2 cycles through the contexts as data requests are received, and passes context numbers to a data cache 3. The next data block in the identified context is read from the appropriate buffer and passed to the TDM interface. When a buffer belonging to a context is empty, a refill request is made via a memory interface 4 to the external memory 5. For a given context, one, two, or three buffers may be empty at a given time, in which case a corresponding number of buffer fill requests are outstanding.

The following table shows an example lookup table for a serial stream having 24 channels, and making use of 7 contexts:

| TDM Channel | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| Context Number | 1 | 2 | 3 | 4 | 5 | 6 | 7 | 7 | 7 | 7 | 7 | 7 | 7 | 7 | 7 | 7 | 7 | 7 | 7 | 7 | 7 | 7 | 7 | 7 |

In this example, channels 0 to 5 are mapped onto context numbers 1 to 7, whilst channels 6 to 23 are all mapped to context 7. It will be appreciated that the buffers of context 7 will be emptied at a much higher rate than those of contexts 1 to 6. This may give rise to problems in refilling the buffers of context 7 at a high enough rate. This is because the data cache 3 and memory interface 4 treat all context refill requests with equal priority. In a worst case scenario, and using the above example, buffers of context 1 to 6 are empty and refill requests made, when one or more buffers of context 7 becomes empty. If the refill request for context 7 is not satisfied quickly enough, the entire context may be emptied so that there is no data available for channels 6 to 23. This causes a break in the data transmitted over the TDM link which is not permitted.

SUMMARY OF THE INVENTION

According to a first aspect of the present invention there is provided a method of providing data for transmission on a time division multiplexed (TDM) serial data stream, the method comprising:

mapping channels of the TDM stream to contexts, each context comprising a set of memory buffers for storing data to be transmitted;

extracting data from the contexts in a sequence defined by said mapping and transmitting the extracted data on the TDM stream;

when a buffer or buffers of a context become empty, generating a buffer refill request to cause data to be read from a memory to refill the buffer, wherein each buffer refill request is assigned a priority; and handling buffer refill requests according to their relative priorities to refill the context buffers.

When employing embodiments of the invention, it is less likely that a context will become completely empty as refill requests associated with contexts which are almost completely empty will tend to be prioritised ahead of those associated with contexts which still have significant fill levels.

In one embodiment of the present invention, the priority assigned to a buffer refill request depends upon the number of buffers of the corresponding context which are empty.

In another embodiment of the invention, the priority assigned to a buffer refill request depends upon the priorities of outstanding buffer refill requests for other buffers of the same context. More preferably, priorities are allocated to the fill requests on a first come first served basis, with a request being allocated the lowest unallocated priority. Once a refill request has been satisfied, the priority of that request is available for allocation to a subsequent request. An advantage of this approach is that when the TDM transmitter is first switched on (a condition in which all buffers of a context will be empty), the entity which handles the refill requests is not overloaded with high priority requests.

In a preferred embodiment of the present invention, the buffer refill requests are generated by a data cache which provides said contexts, and are passed to a memory interface which is responsible for reading data from said memory to refill the buffers. The memory interface places the refill requests in a handling queue according to their relative priorities.

According to a second aspect of the present invention there is provided a serial data transmitter for transmitting data on a time division multiplexed (TDM) serial data stream, the transmitter comprising:
- a data cache arranged in use to provide a set of contexts, each context comprising a set of memory buffers for storing data to be transmitted
- means for storing a mapping of TDM channels to contexts;
- first processing means for extracting data from the contexts in a sequence defined by said mapping and for transmitting the extracted data on the TDM stream;
- second processing means for generating a buffer refill request to cause data to be read from a memory to refill a buffer when a buffer or buffers of a context become empty, and for assigning each buffer refill request a priority; and
- third processing means for handling the buffer refill requests and for refilling the context buffers.

It will be appreciated that the means for storing a mapping of TDM channels to contexts may be a memory device or may be implemented in hardware. The first, second, and third processing means may be provided by a single processor (e.g. a microprocessor or ASIC) or may each comprise a separate processor. The processor(s) may be supported by memory.

In a preferred embodiment of the present invention, the data cache, means for storing a mapping of TDM channels to contexts, first processing means, second processing means, and third processing means, are integrated into a single device.

According to a third aspect of the present invention there is provided a switch for coupling a TDM network to a packet switched network, the switch comprising a TDM transmitter according to the above second aspect of the present invention.

DESCRIPTION OF CERTAIN PREFERRED EMBODIMENTS

Figure 1:
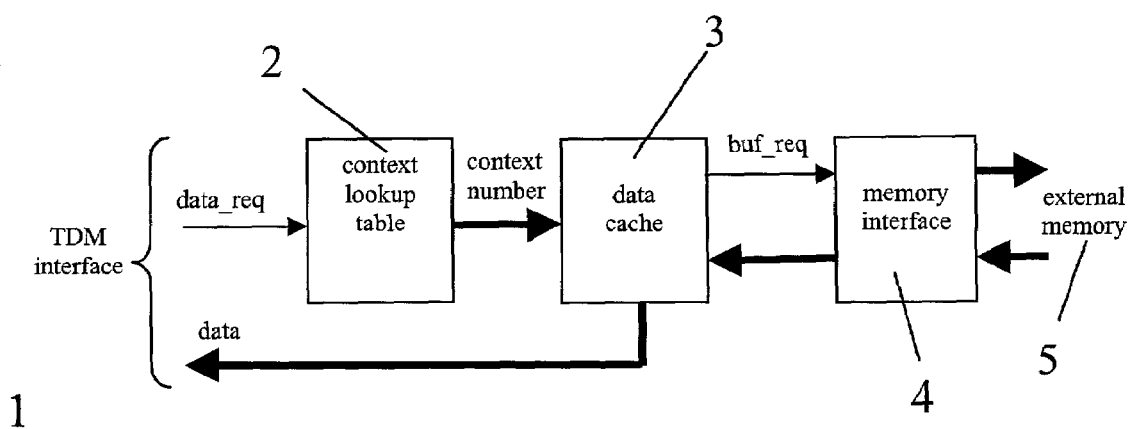
FIG. 1 illustrates schematically a part of a time division multiplexed serial data transmitter.

That part of a TDM serial data transmitter comprising the data cache (for providing the contexts) and means for extracting data from and writing data to the data cache has been described with reference to FIG. 1. For the purpose of describing an embodiment of the present invention reference will again be made to FIG. 1. It is assumed that the functions of the TDM interface, context lookup table, and external memory remain unchanged. Data requests are passed via the TDM interface to the context lookup table. The context lookup table cycles through the contexts according to the channel/context mapping defined there. As it is not possible to predict in advance how many TDM channels will be allocated to a given context, a mechanism should be provided for flexibly dealing with changing context priorities.

Considering the data cache, this provides a number of buffers for each context. For example, each context may have three buffers. When a data request is passed to the data cache (the request identifying a context), the next data block (word) is extracted from one of the buffers. A counter is used to keep track of the "next" location for each context.

Using the corresponding counter, the data cache detects when any of the buffers of a context become empty. For each context, a number of priority levels are available for allocation to buffer refill requests passed to the memory interface—the number of priority levels corresponds to the number of buffers, e.g. three in the present example. The priority levels are allocated on a first come first served basis, with a given refill request being allocated the lowest unallocated priority. Thus for example when a first buffer of a context becomes empty, the corresponding refill request will be allocated a priority level 1 (ie. low). If a second buffer becomes empty while the first buffer remains empty, the second refill request will be allocated a priority level 2 (ie. medium), etc. It may happen for example that a refill requests having priority levels of 1 (low) and 3 (high) are outstanding, in which case when the third buffer becomes empty the corresponding refill request will be allocated a priority level 2 (as that is the lowest unallocated priority).

The buffer refill request containing the priority level is passed from the data cache to the memory interface. The memory interface places a refill request in a queue corresponding to the priority level of the request. Requests in the level 3 queue are dealt with ahead of requests in the level 1 and 2 queues, whilst requests in the level 2 queue are dealt with ahead of requests in the level 1 queue. The memory interface deals with a refill request by reading a block of data from an external (or internal) memory. The read data block is passed to the data cache, where it is written into the appropriate buffer. The memory cache updates the empty buffer record for the context. The priority level allocated to the satisfied request is then made available for a subsequent request.

Figure 2:
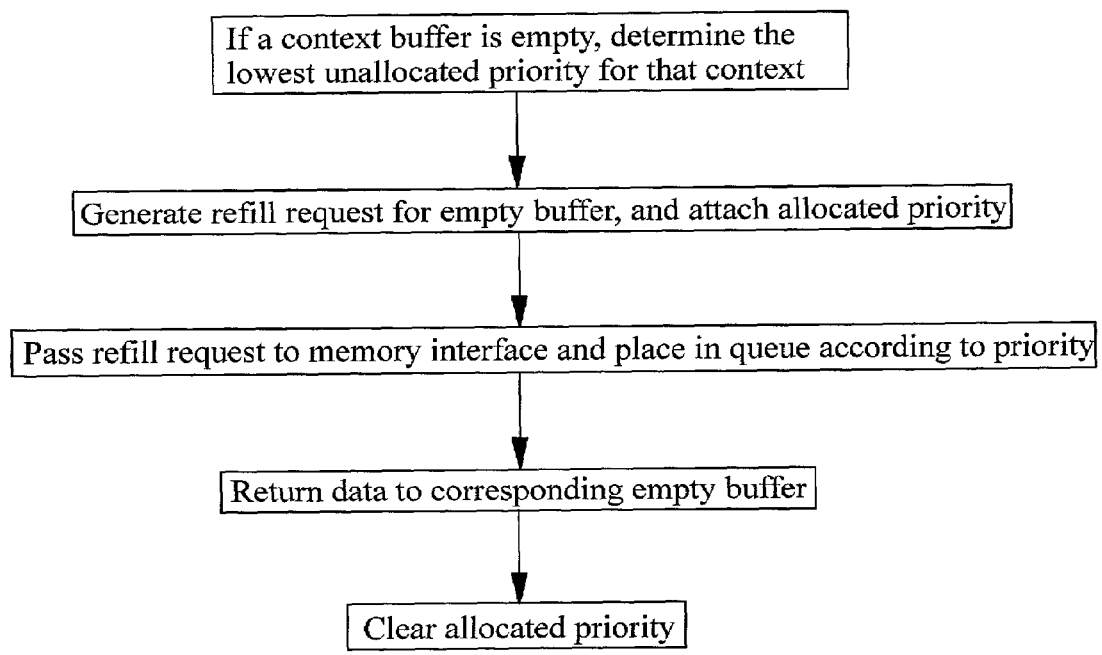
FIG. 2 is a flow diagram illustrating a method of refilling contexts within a data cache of the transmitter of FIG. 1.

FIG. 2 is a flow diagram illustrating the method of refilling the context buffers described above.

It will be appreciated that various modifications may be made to the above described embodiment without departing from the scope of the present invention. For example, the number of contexts and channels may be changed. The number of buffers available to each context may also change. The invention may be employed in a serial data transmitter transmitting a plurality of data streams. In this case, the context lookup table will map contexts to channels of all available streams.

What is claimed is:

1. A method of providing data for transmission on a time division multiplexed (TDM) serial data stream, the method comprising:
   - mapping channels of the TDM stream to contexts, each context comprising a set of memory buffers for storing data to be transmitted;
   - extracting data from the contexts in a sequence defined by said mapping and transmitting the extracted data on the TDM stream;
   - when a buffer or buffers of a context become empty, generating a buffer refill request to cause data to be read from a memory to refill the buffer, wherein each buffer refill request is assigned a priority; and
   - handling buffer refill requests according to their relative priorities to refill the context buffers.

2. A method according to claim 1, wherein the priority assigned to a buffer refill request depends upon the number of buffers of the corresponding context which are empty.

3. A method according to claim 1, wherein the priority assigned to a buffer refill request depends upon the priorities of outstanding buffer refill requests for other buffers of the same context.

4. A method according to claim 3, wherein priorities are allocated to the fill requests on a first come first served basis, with a request being allocated the lowest unallocated priority, and once a refill request has been satisfied, the priority of that request is available for allocation to a subsequent request.

5. A method according to claim 1, wherein the buffer refill requests are generated by a data cache which provides said contexts, and are passed to a memory interface which is responsible for reading data from said memory to refill the buffers.

6. A method according to claim 5, wherein the memory interface places the refill requests in a handling queue according to their relative priorities.

7. A serial data transmitter for transmitting data on a time division multiplexed (TDM) serial data stream, the transmitter comprising:
   a data cache arranged in use to provide a set of contexts, each context comprising a set of memory buffers for storing data to be transmitted
   means for storing a mapping of TDM channels to contexts;
   first processing means for extracting data from the contexts in a sequence defined by said mapping and for transmitting the extracted data on the TDM stream;
   second processing means for generating a buffer refill request to cause data to be read from a memory to refill a buffer when a buffer or buffers of a context become empty, and for assigning each buffer refill request a priority; and
   third processing means for handling the buffer refill requests and for refilling the context buffers.

8. A transmitter according to claim 7, wherein the data cache, means for storing a mapping of TDM channels to contexts, first processing means, second processing means, and third processing means, are integrated into a single device.

9. A switch for coupling a time division multiplexed (TDM) network to a packet switched network, the switch comprising a serial data transmitter for transmitting data on a TDM serial data stream, the transmitter comprising:
   a data cache arranged in use to provide a set of contexts, each context comprising a set of memory buffers for storing data to be transmitted
   means for storing a mapping of TDM channels to contexts;
   first processing means for extracting data from the contexts in a sequence defined by said mapping and for transmitting the extracted data on the TDM stream;
   second processing means for generating a buffer refill request to cause data to be read from a memory to refill a buffer when a buffer or buffers of a context become empty, and for assigning each buffer refill request a priority; and
   third processing means for handling the buffer refill requests and for refilling the context buffers, wherein the data cache, means for storing a mapping of TDM channels to contexts, first processing means, second processing means, and third processing means, are integrated into a single device.

* * * * *

UNITED STATES PATENT AND TRADEMARK OFFICE
CERTIFICATE OF CORRECTION

| | | |
|---|---|---|
| PATENT NO. | : 7,027,455 B2 | Page 1 of 1 |
| APPLICATION NO. | : 10/068593 | |
| DATED | : April 11, 2006 | |
| INVENTOR(S) | : Geoffrey Edward Floyd | |

It is certified that error appears in the above-identified patent and that said Letters Patent is hereby corrected as shown below:

Column 5, Line 17 - Insert -- ; -- at end of line.

Column 6, Line 11 - Insert -- ; -- at end of line.

Signed and Sealed this

First Day of August, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,027,455 B2 | Page 1 of 1 |
| APPLICATION NO. | : 10/068593 | |
| DATED | : April 11, 2006 | |
| INVENTOR(S) | : Geoffrey Edward Floyd | |

It is certified that error appears in the above-identified patent and that said Letters Patent is hereby corrected as shown below:

Please Insert Item [73]
(73) Assignee - Change "Zarlink Semiconductor Limited (GB)" to -- Zarlink Semiconductor V.N. Inc. (Irvine, California) --.

Column 5, Line 17 - Insert -- ; -- at end of line.

Column 6, Line 11 - Insert -- ; -- at end of line.

Signed and Sealed this

Twelfth Day of December, 2006

JON W. DUDAS
*Director of the United States Patent and Trademark Office*